United States Patent [19]
Jalbert

[11] 3,708,905
[45] Jan. 9, 1973

[54] PLASTIC LOBSTER TRAP

[76] Inventor: Donald A. Jalbert, 137 N.E. Washington, Bartlesville, Okla. 74003

[22] Filed: Jan. 26, 1971

[21] Appl. No.: 109,768

[52] U.S. Cl. ................................................43/100
[51] Int. Cl. ..........................................A01k 69/08
[58] Field of Search......................43/100, 102, 105

[56] References Cited

UNITED STATES PATENTS 3,045,386   7/1962   Coyne ................................43/100
3,319,373   5/1967   Gale et al. ..........................43/100

Primary Examiner—Warner H. Camp
Attorney—Bacon & Thomas

[57] ABSTRACT

A lobster trap including a container formed by six planar panels, each comprising a plastic frame having spaced plastic strips mounted thereon. The top panel has a door therein, and the side panels are inclined and one thereof has a conventional lobster entrance means therein. A plurality of plastic ballast boxes are secured to the undersurface of the container, each having downwardly and outwardly pointing feet on the opposite ends thereof.

9 Claims, 7 Drawing Figures

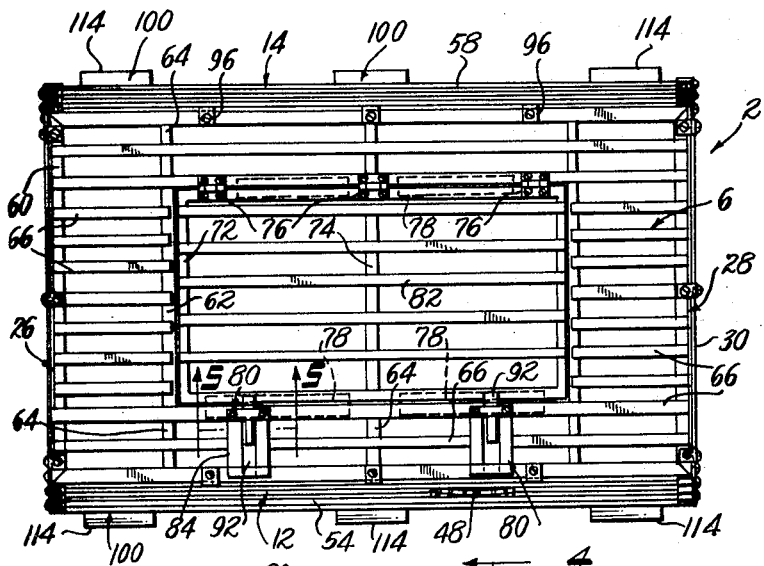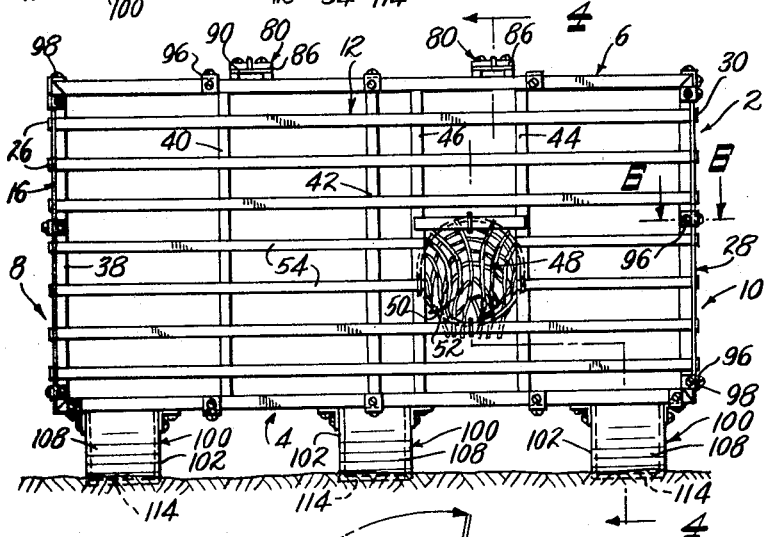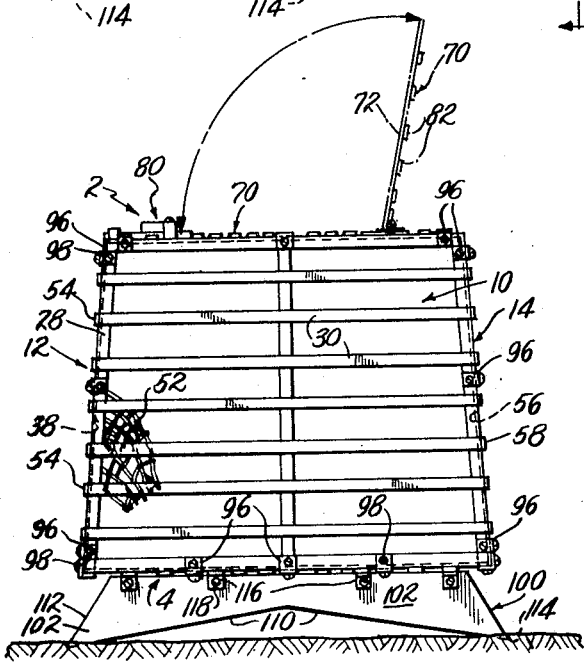

PATENTED JAN 9 1973
3,708,905
SHEET 2 OF 2
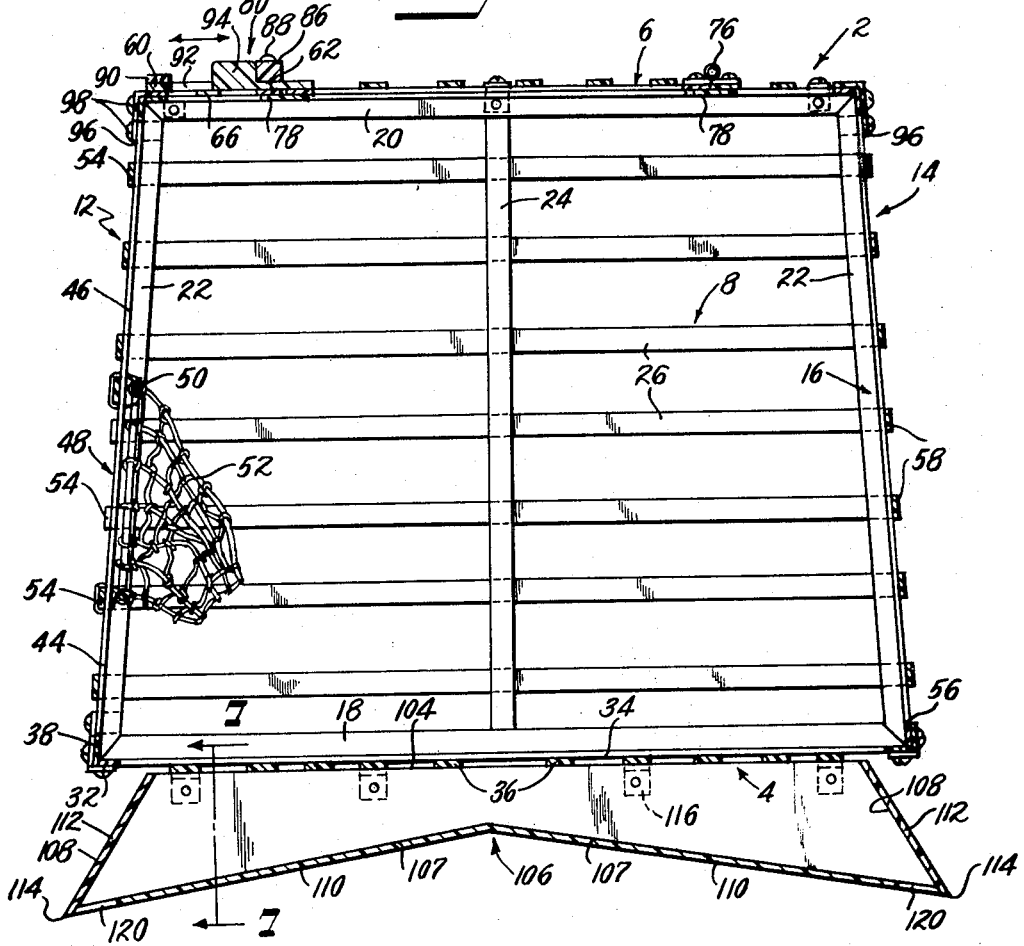
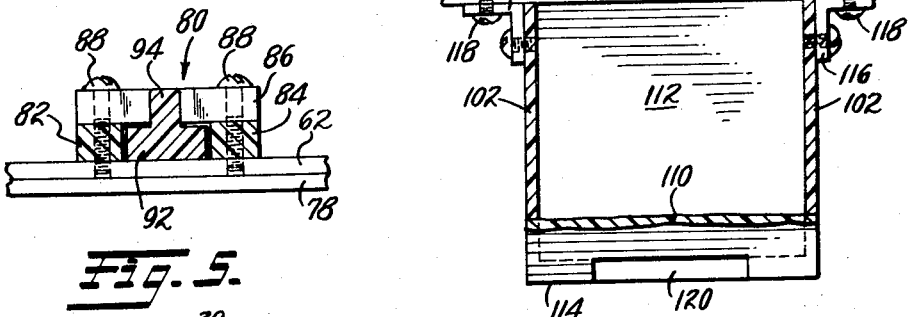
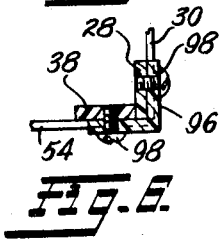
INVENTOR
DONALD A. JALBERT
BY
Bacon & Thomas
ATTORNEYS

PLASTIC LOBSTER TRAP

BACKGROUND OF THE INVENTION

1. Field of the Invention

The present invention relates generally to traps for use in capturing lobsters, and more particularly to an improved lobster trap designed for durability and to remain in place on the bottom of the waters being worked.

2. Description of the Prior Art

There have been traps devised for use in capturing lobsters, such usually being made of wood or metal, or a combination of the two. Wood, of course, becomes waterlogged after prolonged use, and is subject to breakage. Metal traps, even if initially galvanized, tend to rust over a period of time, and in addition are sometimes difficult to handle and stack.

The need thus exists for a durable, easy to handle lobster trap, a need that is met by the present invention.

Lobster traps are lowered to the bottom of the body of water being worked, where they are allowed to rest. In commonly available traps little if any thought has been given to the structure of the trap that engages and rests on the bottom of the bay or river, with the result that set traps are frequently unstable and can be easily overturned. There is thus need for a lobster trap that will be stable when set in place, a need to which the present invention is also addressed.

SUMMARY OF THE INVENTION

The present lobster trap is made substantially entirely from plastic, such as polyethylene, or the petroleum base plastic known commercially as "Marlex," which is relatively impervious to salt water. The trap includes a container made of six planar panels connected together, each panel comprising a plastic frame having spaced plastic strips secured thereto. The container has parallel top and bottom walls, vertical end walls, and side walls that slope inwardly toward each other from the bottom to the top of the container.

One of the inclined sidewalls has a conventional net lobster entrance mounted therein, and the top wall or panel has an access door therein. The inclined sidewalls give stability to the trap as it is lifted from the bottom and ease the passage thereof through the water, and in addition make it possible to stack a number of lobster traps without damage to the lobster entrance nets.

The bottom wall or panel of the container has a plurality of parallel, transversely disposed ballast boxes secured thereto, each of which has downwardly and outwardly directed pointed feet on its opposite ends. The feet on the ballast boxes sink into the bottom of the body of water being worked, and give stability to the set trap so that it cannot be easily overturned.

It is a principal object of the present invention to provide a lobster trap that is made of plastic, for ease of handling and durability.

Another object is to provide a lobster trap that can be easily lifted from the water, and which remains stable as it is being raised through the water.

A further object is to provide a lobster trap that will remain in a stable position when set on the bottom of a body of water, and which cannot be easily overturned.

Other objects and many of the attendant advantages of the invention will become readily understood from the following Description of the Preferred Embodiment, when taken together with the accompanying drawings.

DESCRIPTION OF THE DRAWING

FIG. 1 is a top view of the lobster trap of the present invention;

FIG. 2 is a front elevational view of the lobster trap of FIG. 1;

FIG. 3 is a side elevational view of the lobster trap of FIG. 2, as viewed from the right end thereof, with the door being shown in open position in phantom lines, and showing the pointed feet digging into the bottom;

FIG. 4 is an enlarged transverse vertical sectional view, taken on the staggered section line 4—4 of FIG. 2;

FIG. 5 is an enlarged fragmentary vertical sectional view, taken on the line 5—5 of FIG. 1, through one of the door latches;

FIG. 6 is an enlarged fragmentary horizontal sectional view taken on the line 6—6 of FIG. 2 showing the manner of assembling two adjacent panels; and;

FIG. 7 is an enlarged fragmentary vertical sectional view, taken on the line 7—7 of FIG. 4, through one of the ballast boxes.

DESCRIPTION OF THE PREFERRED EMBODIMENT

Referring now to the drawings, the lobster trap of this invention is indicated at 2 and includes a bottom panel 4, a top panel 6, identical end panels 8 and 10, a front side panel 12, and a back side panel 14, all of the panels being generally planar and made of plastic.

The end panel 8 is shown in detail in FIG. 4, and includes a trapezoidal frame 16 comprising parallel bottom and top plastic members 18 and 20, respectively, connected at their ends by inclined plastic side members 22, and centrally thereof by a vertical brace member 24. The members 18, 20, 22 and 24 can be formed separately and bonded together to form the frame 16, as shown, or the frame 16 can be molded in one piece. Secured by bonding to the outside of the frame 16 are horizontally extending, spaced parallel plastic strips 26. Again, if desired, the strips 26 could be molded integrally with the frame 16.

The end panel 10 is constructed identically to the end panel 8, and includes a trapezoidal plastic frame 28 having spaced horizontal plastic strips 30 mounted thereon. Similarly, the bottom panel 4 comprises an elongated rectangular plastic frame 32 having a plurality of parallel, spaced plastic brace members 34 extending transversely thereacross. Spaced parallel plastic strips 36 are secured to the lower side of the bottom frame 32, and extend longitudinally of the lobster trap 2.

The front panel 12 is also an elongated rectangle, and includes a rectangular plastic frame 38 having three equally spaced, parallel plastic brace members 40, 42 and 44 extending vertically thereacross. Another vertical brace member 46 is positioned between the brace members 42 and 44, and a conventional lobster entrance 48 comprising a wire ring 50 and a net 52 is mounted between the brace members 46 and 44. Spaced, parallel plastic strips 54 are secured to the front panel frame 38, the entrance 48 being left free for the entry of lobsters.

The rear panel 14 is constructed identically to the front panel 12, except that it does not include the fourth brace member 46 or the lobster entrance 48, and comprises a rectangular plastic frame 56 having plastic strips 58 mounted in parallel spaced relationship thereon. If desired, of course, another lobster entrance like that shown at 48 could be mounted on the rear panel 14.

The top panel 6 includes an outer rectangular plastic frame 60 and a smaller inner rectangular plastic frame 62, the inner frame 62 being centrally supported within the outer frame 60 by six transverse plastic frame members 64. The area between the inner and outer frames 60 and 62 has spaced plastic strips 66 mounted thereon, and the inner frame 62 defines an access opening 68 that is fitted with a door 70.

The door 70 is made of plastic, and includes a rectangular frame 72 having a central transverse brace member 74. The base edge of the frame 72 is secured to the inner frame 62 by plastic hinges 76, and the undersides of the two longer sides of the inner frame have plastic stop strips 78 secured thereto to prevent the door 70 from falling into the interior of the lobster trap 2. The door 70 is held in a closed position against the stop strips 78 by a pair of spaced latches 80, and the door frame 72 has spaced plastic strips 82 secured thereto.

The latches 80 are of identical construction, and each includes two spaced spacer strips 84 secured at their opposite ends to the frames 60 and 62. A forward bridging member 86 is connected to the strips 84 over the frame 62 by screws 88, and a rear bridging member 90 is bonded to the outer ends of the strips 84. A slide latch 92 is received between the spaced strips 84 and beneath the bridging members 86 and 90, and has a handle 94 formed thereon. When the slide 92 is moved to engage the handle 94 with the bridging member 86 the forward end of the slide will lock the closed door 70 in position.

The six panels 4, 6, 8, 10, 12 and 14 are secured together along their mating edges by spaced plastic angle members 96 and screws 98, as shown in detail in FIG. 6. At least three spaced angle members 96 are employed on each of the twelve edges of the lobster trap 2, such serving to form the panels into a strong but lightweight container.

The lobster trap 2 is used by letting it down to rest on the bottom of a body of water. For ideal conditions of use the trap 2 should set firmly on the bottom, and should not be easy to overturn. The invention includes three spaced transversely disposed plastic ballast boxes 100 on the undersurface thereof that achieve this desired result.

The boxes 100 are made of plastic, and are identical. Each include a pair of identical vertical, parallel sidewalls 102. Each sidewall 102 has a straight top edge 104, and has a shallow inverted V 106 cut in the bottom edge thereof, whereby to produce two upwardly inclined edges 107. The end edges 108 of the sidewalls 102 slope inwardly and upwardly from the lower corner thereof, whereby to form points on the lower corners of the sidewall.

The edges 107 are joined by bottom walls 110 that extend therebetween and the inclined end edges 108 are joined by end walls 112. The bottom edges of the end walls 112 and the outer, bottom ends of the bottom walls 110 meet, and together with the pointed lower corners of the sidewalls 102 define feet 114 that point outwardly and downwardly.

The ballast boxes 100 are of sufficient length so that the feet 114 extend laterally beyond the bottom panel 4 of the lobster trap 2, and said boxes are secured to the spaced strips 36 by plastic angle members 116 and screws 118. The ballast boxes 100 can be fitted with rocks or other suitable ballast, and the lower ends of the inclined bottom walls 110 have drain holes 120 formed therein.

In use the lobster trap 2 is baited, and is then lowered to the bottom by a rope, a hook or other suitable hoisting means. As the trap 2 settles on the bottom the pointed feet 114 of the ballast boxes 100 tend to dig into the mud, with penetration being limited by engagement of the inclined bottom panels 110 with the bottom. Once settled in place, the ballast boxes 100 give great stability to the trap, the projection of the feet 114 beyond the trap aiding in this.

When it is desired to take in the lobster trap 2 such is simply lifted from the bottom, the inclined side panels 12 and 14 making movement through the water relatively easy, and giving stability to the moving trap 2. Any captured lobsters are then removed through the door 72, and the trap is then either reset or placed in storage. If the latter, the inclined side walls 12 and 14 help ensure that the netting 52 of the lobster entrance 48 on one trap is not damaged by another trap placed immediately adjacent.

The present invention is thus seen to satisfy the objects set forth hereabove. Obviously, changes and variations in the invention are possible.

I claim:

1. A lobster trap, comprising: a container including parallel top and bottom panels, a pair of vertical end panels, and a pair of side panels that slope inwardly from said bottom panel toward said top panel, all of said panels being made of spaced plastic strips mounted on frame means, said bottom panel having base means thereon provided with downwardly and outwardly directed feet that dig into the bottom of a body of water to give stability to the set trap, said top panel having door means therein, and one of the remainder of said panels having a lobster entrance means therein.

2. A lobster trap as recited in claim 1, wherein all of said panels are planar, and said frame means, said door means and said base means are also made of plastic.

3. A lobster trap, comprising: a container including parallel top and bottom panels, a pair of vertical end panels, and a pair of side panels that slope inwardly from said bottom panel toward said top panel, all of said panels being made of spaced plastic strips mounted on frame means, said bottom panel having base means thereon, said top panel having door means therein, and one of the remainder of said panels having a lobster entrance means therein, said base means comprising: a plurality of transversely extending ballast boxes secured to the underside of said bottom panel, each of said ballast boxes comprising: a pair of parallel, generally vertical sidewalls, the bottom edge of each sidewall having the configuration of a shallow inverted V, and the opposite end edges of said sidewalls sloping inwardly from the bottom to the top thereof, whereby the opposite lower corners of each sidewall form pointed feet; a bottom wall extending between the bottom edges of said sidewalls; and a pair of end walls, one mounted to extend between each pair of said end edges.

4. A lobster trap as recited in claim 3, wherein said sidewalls, said bottom wall and said end walls are made of plastic, and wherein said bottom wall has drain holes therein.

5. A lobster trap as recited in claim 3, wherein said ballast boxes are of a length such that said pointed feet thereon extend laterally from said bottom panel.

6. A lobster trap, comprising: a container including rectangular, parallel top and bottom panels, a pair of trapezoidal vertical end panels, and a pair of rectangular side panels that slope inwardly from said bottom panel toward said top panel, each of said panels comprising a plastic frame having spaced plastic strips mounted thereon, said frames being joined along the edges thereof to form said container; a door mounted on said top panel; a lobster entrance means in at least one of said side panels; and a plurality of plastic ballast boxes secured to the underside of said bottom panel, said ballast boxes having pointed feet on the outer, lower corners thereof.

7. A lobster trap as recited in claim 6, wherein said ballast boxes each extend transversely of said bottom panel, and comprise: a pair of generally vertical, spaced parallel sidewalls, the bottom edge of each sidewall defining a shallow inverted V, and the end edges of said sidewalls sloping inwardly from the bottom to the top thereof; a bottom wall extending between said bottom edges; and end walls extending between said end edges and abutting the end edges of said bottom wall.

8. A lobster trap as recited in claim 7, wherein said bottom wall of each ballast box has drain holes therein, and wherein said pointed feet are positioned laterally outwardly of said bottom panel of said container.

9. A lobster trap, comprising: a container including a bottom panel; and a plurality of spaced and generally parallel ballast boxes mounted on the underside of said bottom panel, each of said boxes comprising: a pair of generally vertical, spaced parallel sidewalls, the bottom edge of each sidewall defining a shallow inverted V, and the end edges of said sidewalls sloping inwardly from the bottom to the top thereof; a bottom wall extending between said bottom edges; and end walls extending between said end edges and abutting the end edges of said bottom wall, whereby downwardly and outwardly pointing feet are formed on the lower corners of said box.

* * * * *